United States Patent
Komatsu et al.

(10) Patent No.: US 6,706,249 B1
(45) Date of Patent: Mar. 16, 2004

(54) COMPOSITE POLYBASIC SALT, PROCESS FOR PRODUCING THE SAME, AND USE

(75) Inventors: Yoshinobu Komatsu, Chuo-ku (JP); Hitoshi Ishida, Chuo-ku (JP); Hiroshi Igarashi, Chuo-ku (JP); Masami Kondo, Chuo-ku (JP); Madoka Minagawa, Chuo-ku (JP); Tetsu Sato, Chuo-ku (JP); Teiji Sato, Chuo-ku (JP)

(73) Assignee: Mizusawa Industrial Chemicals Ltd., Tokyo (JP)

( * ) Notice: Subject to any disclaimer, the term of this patent is extended or adjusted under 35 U.S.C. 154(b) by 230 days.

(21) Appl. No.: 09/786,423

(22) PCT Filed: Jul. 7, 2000

(86) PCT No.: PCT/JP00/04554

§ 371 (c)(1),
(2), (4) Date: Mar. 6, 2001

(87) PCT Pub. No.: WO01/04053

PCT Pub. Date: Jan. 18, 2001

(30) Foreign Application Priority Data

Jul. 8, 1999 (JP) .......................................... 11-195117

(51) Int. Cl.$^7$ ................................................. C01F 7/76
(52) U.S. Cl. .................... 423/518; 252/62; 423/277; 423/306; 423/326; 423/327.1; 423/395; 423/420.2; 524/80; 534/10; 534/11; 534/15; 556/42; 556/45; 556/51; 556/57; 556/110; 556/136; 556/138; 556/170; 562/30; 562/45; 562/887; 564/305
(58) Field of Search ................................ 423/420.2, 636, 423/518, 277, 306, 326, 327.1, 395, 593, 595, 599, 600

(56) References Cited

U.S. PATENT DOCUMENTS

| | | | | |
|---|---|---|---|---|
| 4,539,195 A | * | 9/1985 | Schanz et al. | 423/430 |
| 4,560,545 A | * | 12/1985 | Spickett et al. | 423/600 |
| 4,629,626 A | * | 12/1986 | Miyata et al. | 423/594 |
| 4,904,457 A | * | 2/1990 | Misra | 423/430 |
| 5,250,279 A | * | 10/1993 | Preston et al. | 423/420.2 |
| 5,362,457 A | * | 11/1994 | Grubbs et al. | 423/420.2 |
| 5,484,583 A | * | 1/1996 | Grubbs et al. | 423/420.2 |
| 5,507,980 A | * | 4/1996 | Kelkar et al. | 423/420.2 |
| 5,578,286 A | * | 11/1996 | Martin et al. | 423/426.2 |
| 5,728,366 A | * | 3/1998 | Martin et al. | 423/420.2 |
| 5,730,951 A | * | 3/1998 | Martin et al. | 423/420.2 |
| 5,776,424 A | * | 7/1998 | Martin et al. | 423/420.2 |
| 5,814,291 A | * | 9/1998 | Kelkar | 423/420.2 |
| 6,287,532 B1 | * | 9/2001 | Okada et al. | 423/420.2 |
| 6,440,888 B1 | * | 8/2002 | Stamires et al. | 42/420.2 |
| 6,444,188 B1 | * | 9/2002 | Stamires et al. | 423/420.2 |

* cited by examiner

*Primary Examiner*—Wayne A. Langel
(74) *Attorney, Agent, or Firm*—Sherman & Shalloway (57) ABSTRACT

A composite metal polybasic salt containing a trivalent metal and magnesium as metal components and having a novel crystal structure, and a method of preparing the same. The invention further deals with a composite metal polybasic salt which has anion-exchanging property, which by itself is useful as an anion-exchanger, capable of introducing anions suited for the use upon anion-exchange, and finds a wide range of applications, and a method of preparing the same. The composite metal polybasic salt has a particular chemical composition and X-ray diffraction peaks, and further has a degree of orientation ($I_o$) of not smaller than 1.5.

7 Claims, 7 Drawing Sheets

IR SPECTRA OF ANION-EXCHANGE MEMBERS OF PBS SERIES
(A) ANION=$SO_4^{2-}$(BASE)
(B) ANION=$CO_3^{2-}$
(C) ANION=$H_2PO_4^-$
(D) ANION=$HPO_4^{2-}$
(E) ANION=$PO_4^{3-}$
(F) ANION=$Si_3O_7^{2-}$
(G) ANION=STEARATE($C_{18}H_{35}^-$)
(H) HYDROTALCITE

FIG. 1

IR SPECTRA OF ANION-EXCHANGE
MEMBERS OF PBS SERIES

(A) ANION=$SO_4^{2-}$(BASE)
(B) ANION=$CO_3^{2-}$
(C) ANION=$H_2PO_4^-$
(D) ANION=$HPO_4^{2-}$
(E) ANION=$PO_4^{3-}$
(F) ANION=$Si_3O_7^{2-}$
(G) ANION=STEARATE($C_{18}H_{35}^-$)
(H) HYDROTALCITE

FIG.2

X-RAY DIFFRACTION IMAGE OF THE COMPOSITE METAL POLYBASIC SALT PBS (EX.3)

FIG.3

X-RAY DIFFRACTION IMAGE OF MAGALDRATE.

FIG.4

HIGH-ANGLE SIDE

X-RAY DIFFRACTION IMAGE OF
USP-REFERRED STANDARD MAGALDRATE.

FIG.5

X-RAY DIFFRACTION IMAGE OF
HYDROTALCITE(COMP.EX.2)

FIG.6

X-RAY DIFFRACTION IMAGE OF A SALT OF
LITHIUM ALUMINUM COMPOSITE HYDROXIDE (COMP.EX.3)

FIG.7

HOW TO FIND A LAMINATE ASYMMETRIC INDEX

SCANNING-TYPE ELECTRON MICROPHOTOGRAPH OF EX.3.

FIG.10

SCANNING-TYPE ELECTRON MICROPHOTOGRAPH OF EX.6.

FIG.11

RELATIONSHIP BETWEEN THE FEEDING Mg/Al COMPOSITION RATIO AND THE Mg/Al COMPOSITION RATIO OF THE PRODUCT

FIG. 12

RELATIONSHIP BETWEEN THE Mg/Al COMPOSITION RATIO OF THE PRODUCT AND THE $SO_3$ CONTENT

FIG. 13

X-RAY DIFFRACTION IMAGES AT THE FEEDING Mg/Al COMPOSITION RATIOS

COMPOSITE POLYBASIC SALT, PROCESS FOR PRODUCING THE SAME, AND USE

TECHNICAL FIELD

The present invention relates to a composite metal polybasic salt having a novel crystalline structure, a method of preparing the same and use thereof.

BACKGROUND ART

As synthetic composite metal hydroxides, there have heretofore been known a hydrotalcite-type synthetic mineral (e.g., Japanese Examined Patent Publication (Kokoku) No. 32198/1972) and a salt of lithium aluminum composite hydroxide (e.g., Japanese Examined Patent Publication (Kokoku) No. 2858/1995).

There has further been known a polybasic aluminum-magnesium salt. Japanese Examined Patent Publication (Kokoku) No. 38997/1974 teaches a method of producing a polybasic aluminum salt by reacting a polybasic aluminum sulfate with a magnesium hydroxide at a molar ratio of Al/Mg=1/2 to 4/3 in the presence of water. There has been further stated that the polybasic aluminum magnesium salt can be effectively used as an antacid.

Japanese Unexamined Patent Publication (Kokai) No. 204617/1985 teaches a method of preparing a magaldrate expressed by the formula $Al_5Mg_{10}(OH)_{31}(SO_4)_2 \cdot xH_2O$ by reacting an active aluminum hydroxide with a stoichiometric amount of water-soluble sulfate-containing compound, active magnesium oxide and(or) magnesium hydroxide in the presence of water and, if necessary, drying the resulting magaldrate paste.

Japanese Unexamined Patent Publication (Kokai) No. 102085/1989 discloses a novel aluminum magnesium hydroxy compound represented by the formula $AlxMgy(OH)_{35-z}R_2 \cdot nH_2O$ [wherein R is a residue RC00- of monocarboxylic acid, and indexes x, y and z satisfy the following conditions $3 \leq x \leq 9$, $4 \leq y \leq 13$, $3 \leq z \leq 5$ and $3x+2y=35$].

Japanese Unexamined Patent Publication (Kokai) No. 164432/1989 discloses an aluminum magnesium hydroxy compound having a layer structure represented by the general formula $AlxMgy(OH)_{35-z}R_2 \cdot nH_2O$ [wherein R is a residue RC00- of monocarboxylic acid, RC00- having 2 to 22 carbon atoms, and indexes x, y and z satisfy the following conditions $3 \leq x \leq 9$, $4 \leq y \leq 13$, $3 \leq z \leq 5$ and $3x+2y=35$], and a gel composition containing an oleophilic organic compound which is in the liquid form at room temperature (20° C.).

Japanese Examined Patent Publication (Kokoku) No. 59977/1989 discloses a crystalline basic aluminum magnesium carbonate represented by the formula $Al_2Mg_6(OH)_{12}(CO_3)_2 \cdot xH_2O$ [wherein $x \leq 4$].

Further, Japanese Examined Patent Publication (Kokoku) No. 52409/1991 discloses a method of producing a hydroxy-aluminum magnesium sulfate by reacting a solid magnesium hydroxide and/or magnesium oxide with an aqueous solution of aluminum sulfate at an atomic ratio of magnesium:aluminum of from 1:1 to 3:1 until the pH of the reaction mixture becomes 4.0 to 8.0, removing the water-soluble component from the reaction mixture by a known method, followed, if necessary, by drying.

A conventional polybasic aluminum magnesium salt, e.g., a USP-referred standard magaldrate exhibits diffraction peaks at 2θ=10 to 12°, 2θ=22 to 24°, 2θ=33 to 35°, 2θ=45 to 47° and 2θ=60 to 63° in the X-ray diffraction (Cu-α), whereas the polybasic aluminum magnesium salt of the present invention in which the anions are sulfuric ions exhibits diffraction peaks at 2θ=2 to 15°, 2θ=19.5 to 24° and 2θ=33 to 50° in the X-ray diffraction (Cu-α), and a single peak at 2θ=60 to 64°. The present inventors have succeeded in synthesizing a novel composite metal polybasic salt that has an explicit crystal structure exhibiting a single X-ray diffraction (Cu-α) peak at 2θ=33 to 50°, the crystal structure being different from those of hydrotalcites.

The inventors have further discovered that the composite metal polybasic salt can be effectively used as an additive for resins, as a heat insulator and as an anion-exchanger.

DISCLOSURE OF THE INVENTION

The object of the present invention is to provide a composite metal polybasic salt containing a trivalent metal and magnesium as metal components and having a novel crystal structure, and a method of preparing the same.

Another object of the present invention is to provide a composite metal polybasic salt which has anion-exchanging property, which by itself is useful as an anion-exchanger, capable of introducing anions suited for the use upon anion-exchange, and finds a wide range of applications, and a method of preparing the same.

According to the present invention, there is provided a composite metal polybasic salt having a chemical composition represented by the following general formula (1), $$M^{3+}{}_pMg_q(OH)_y(A)_z \cdot nH_2O \tag{1}$$

wherein $M^{3+}$ is a trivalent metal, A is an inorganic or organic anion, and p, q, y and z are numbers satisfying the following formulas, (i) $3p+2q-y-mz=0$ (wherein m is a valency of anion A),
(ii) $0.3 \leq q/p \leq 2.5$,
(iii) $1.5 \leq y/(p+q) \leq 3.0$, and
(iv) $4.0 \leq (p+q)/z \leq 20.0$, and n is a number of not larger than 7, exhibiting diffraction peaks at 2θ=2 to 15°, 2θ=19.5 to 24° and 2θ=33 to 50°, and a single peak at 2θ=60 to 64° in the X-ray diffraction (Cu-α), and having a degree of orientation ($I_0$) represented by the following formula (2) of not smaller than 1.5, $$I_0 = I_{10}/I_{60} \tag{2}$$

wherein $I_{10}$ is an X-ray diffraction peak intensity at 2θ=2 to 15°, and $I_{60}$ is an X-ray diffraction peak intensity at 2θ=60 to 64°.

In the present invention, it is desired that an X-ray diffraction (Cu-α) peak at 2θ=33 to 50° is a single peak.

In the present invention, it is desired that the trivalent metal ($M^{3+}$) in the above formula is aluminum. In this case, q/p can be not larger than 2.0.

In the present invention, further, it is desired that the anions (A) in the above formula are sulfuric acid ions. The sulfuric acid ions have anion-exchanging property, and can be exchanged with carbonic acid ions, organocarboxylic acid ions, phosphoric acid ions, silicic acid ions, perchloric acid ions, aluminic acid ions or sulfonic acid ions.

The composite metal polybasic salt of the present invention exhibits X-ray diffraction peaks at the above-mentioned Bragg angle. For example, the Al—Mg—SO₄ composite metal polybasic salt which is a product of the invention, generally, has the following X-ray diffraction image:

| 2 θ | Relative intensity |
|---|---|
| 10 to 12° | 100% |
| 20 to 22° | 20 to 80% |
| 33 to 50° | 10 to 60% |
| 60 to 63° | 5 to 50% |

In this case, the degree of orientation ($I_0$) is from 2 to 20.

When photographed by using a scanning-type electron microscope, the composite metal polybasic salt of the present invention has a pleat-like thin-piece texture with a honeycomb-type or pumice-type internal structure.

Among the above X-ray diffraction peaks, a peak at 2θ=33 to 50° is singular, and a laminate asymmetric index (Is) defined by the following formula (3), $$Is = \tan\theta_2 / \tan\theta_1 \quad (3)$$

wherein $\theta_1$ is an angle subtended by a peak perpendicular in the X-ray diffraction peak of a predetermined spacing and a peak tangent on the narrow angle side, and $\theta_2$ is an angle subtended by the peak perpendicular at the above peak and a peak tangent on the wide angle side, is not smaller than 1.5 at a peak of 2θ=33 to 50°.

According to the present invention, there is further provided a method of preparing a composite metal polybasic salt by reacting a water-soluble salt of a trivalent metal with an oxide, a hydroxide or a water-soluble salt of magnesium under the conditions of a pH of from 6.0 to 9.0 and a temperature of not lower than 50° C. and, preferably, not lower than 80° C. and, if necessary, executing the ion exchange in the presence of an acid or a soluble salt of acid.

According to the present invention, further, there is provided an additive for resins, a heat insulator and an anion-exchanger comprising the composite metal polybasic salt.

In the anion-exchanger, it is desired that the anions of the composite metal polybasic salt are sulfuric acid ions.

EMBODIMENT OF THE INVENTION

[Composite Metal Polybasic Salt]

A first feature of the composite metal polybasic salt (hereinafter often referred to as PBS) of the present invention is that it has a chemical composition expressed by the above-mentioned formula (1). That is, the number p of mols of the trivalent metal, the number q of mols of magnesium metal, the number y of mols of hydroxyl groups and the number z of mols of anions all lie within ranges satisfying the above formulas (i) to (iv).

A hydrotalcite which is a representative example of the known composite metal polybasic salt or of the composite metal hydroxide salt, typically, has a chemical composition expressed by the following formula (4), $$Mg_6Al_2(OH)_{16}CO_3 \cdot nH_2O \quad (4)$$

and q/p in the above-mentioned formula (ii) corresponds to 3.0. In the composite metal polybasic salt of the present invention, however, q/p is not larger than 2.5 and, particularly, not larger than 2.0, and has a chemical composition different from that of the hydrotalcite.

The magaldrate, $Al_5Mg_{10}(OH)_{31}(SO_4)_2 \cdot xH_2O$, which is a known polybasic salt exhibits X-ray diffraction (Cu-α) peaks at 2θ=10 to 12°, 2θ=22 to 24°, 2θ=33 to 35°, 2θ=38 to 40°, 2θ=45 to 47°, and 2θ=60 to 63°, and has a laminate asymmetric index (Is) defined by the following formula (3), $$Is = \tan\theta_2 / \tan\theta_1 \quad (3)$$

wherein $\theta_1$ is an angle subtended by a peak perpendicular in the X-ray diffraction peak of a predetermined spacing and a peak tangent on the narrow angle side, and $\theta_2$ is an angle subtended by the peak perpendicular at the above peak and a peak tangent on the wide angle side, over a range of from 1.0 to 2.5 at a peak of 2θ=33 to 35°, and further has a degree of orientation ($I_0$) represented by the following formula (2), $$I_0 = I_{10}/I_{60} \quad (2)$$

wherein $I_{10}$ is an X-ray diffraction peak intensity at 2θ=2 to 15°, and $I_{60}$ is an X-ray diffraction peak intensity at 2θ=60 to 64°, of not larger than 1. Accordingly, the magaldrate is different in a crystal structure from the product of the present invention.

As another example of the composite metal polybasic salt, there has been known a salt of lithium aluminum composite hydroxide of the following formula (5), $$[Al_2Li(OH)_6]nX \cdot mH_2O \quad (5)$$

This compound does not contain a divalent metal but has a monovalent metal, making a difference from the composite metal polybasic salt of the present invention. Even if two mols of a monovalent metal is equivalent to a mol of a divalent metal, q/p in the above-mentioned formula ii) corresponds to 0.25 when X is $CO_3$ or $SO_3$ (n=2). In the composite metal polybasic salt of the present invention, q/p is not smaller than 0.3 and its chemical composition is also different from that of the known salt of lithium aluminum composite hydroxide.

It is considered that the composite metal polybasic salt of the present invention has the following chemical structure. In this compound, a $Mg(OH)_6$ octahedral layer of which Mg is isomorphous-substituted by $M^{3+}$ serves as a basic layer, and anions such as sulfuric acid radicals are incorporated among the basic layers in a form to be balanced with excess of cations due to the substitution. The layered crystal structure is formed by a stack of many basic structures.

Anions such as sulfuric acid radicals present in the composite metal polybasic salt have anion-exchanging property and can be substituted with carbonic acid ions, organocarboxylic acid ions, phosphoric acid ions, silicic acid ions (including condensed silicic acid ions), and the like ions.

The content Qo (milliequivalent/100 g) of sulfuric acid radicals in the composite metal polybasic salt is from 240 to 420 milliequivalent/100 g.

As the trivalent metal $M^{3+}$ constituting the composite metal polybasic salt, there can be exemplified Al, Sc, Ti, V, Cr, Mn, Fe, Co, Ni, Ga, Y, Ru, Rh, In, Sb, La, Ce, Nd, Pm, Sm, Eu, Gd, Tb, Dy, Ho, Er, Tm, Yb, Lu, Os, Ir, Au, Bi, Ac and Th. Among them, Al is preferred.

As the anions A constituting the composite metal polybasic salt, there can be exemplified inorganic anions and organic anions. As the inorganic anions, there can be exemplified oxygen acid anions such as of S, P, Al, Si, N, B, V, Mn, Mo, W, Cr, Te and Sn, as well as carbonic acid anions.

As the organic anions, there can be exemplified carboxylic acid anions such as of acetic acid, propionic acid, butyric acid, palmitic acid, stearic acid, myristic acid, oleic acid, linolic acid, adipic acid, fumaric acid, maleic acid, citric acid, tartaric acid, malic acid, cyclohexanecarboxylic acid, benzoic acid, salicylic acid, phthalic acid and terephthalic acid; sulfonic acid anions such as of methane sulfonic acid, toluene sulfonic acid, lignin sulfonic acid and dodecylbenzene sulfonic acid; aromatic primary amines such as sulfanilic acid, aniline, o-toluidine, m-toluidine, metanilic acid and benzylamine as well as of hydrochloric acid, nitric acid, sulfuric acid, phosphoric acid, hydrobromic acid and hydrofluoric acid.

Figure 1:
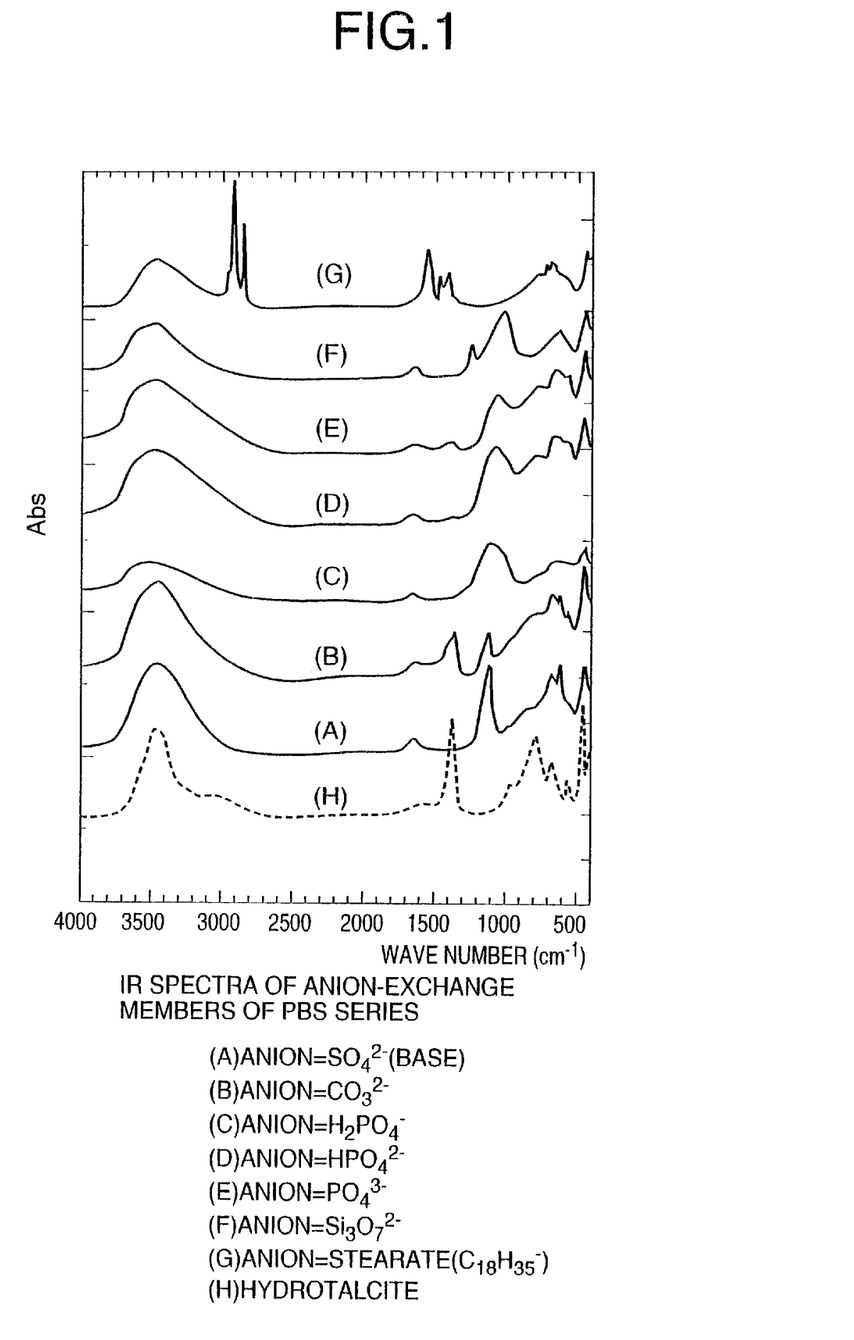
FIG. 1 is a diagram comparing infrared-ray absorption spectra of composite metal polybasic salts which are the products of the invention with that of a hydrotalcite.

FIG. 1 in the accompanying drawings shows infrared-ray absorption spectra of the composite metal polybasic salts of the present invention in comparison with the infrared-ray absorption spectrum of a hydrotalcite.

That is, FIG. 1(A) is an infrared-ray absorption spectrum of an Al—Mg-type composite metal polybasic salt in which the anions are sulfuric acid ions, FIG. 1(B) is an infrared-ray absorption spectrum of an Al—Mg-type composite metal polybasic salt in which the anions are carbonic acid ions, FIG. 1(C) is an infrared-ray absorption spectrum of an Al—Mg-type composite metal polybasic salt in which the anions are dihydrogen phosphoric acid ions, FIG. 1(D) is an infrared-ray absorption spectrum of an Al—Mg-type composite metal polybasic salt in which the anions are monohydrogen phosphoric acid ions, FIG. 1(E) is an infrared-ray absorption spectrum of an Al—Mg-type composite metal polybasic salt in which the anions are phosphoric acid ions, FIG. 1(F) is an infrared-ray absorption spectrum of an Al—Mg-type composite metal polybasic salt in which the anions are silicic acid ions, FIG. 1(G) is an infrared-ray absorption spectrum of an Al—Mg-type composite metal polybasic salt in which the anions are stearic acid ions, and FIG. 1(H) is an infrared-ray absorption spectrum of a hydrotalcite in which the anions are carbonic acid ions.

From these infrared-ray absorption spectra, it is learned that the composite metal polybasic salts of the present invention exhibit characteristic absorptions due to the hydroxyl group at wave numbers of from 3800 to 2700 $cm^{-1}$ and characteristic absorptions due to the incorporated anions at wave numbers of from 900 to 1500 $cm^{-1}$. In particular, the composite metal polybasic salts of the invention exhibit sharp absorption peaks in the far infrared regions of a wave number of not larger than 2000 $cm^{-1}$, and are useful as a heat insulator for absorbing heat rays.

Further, the Al—Mg-type composite metal polybasic salt in which the anions are stearic acid ions, exhibits characteristic absorptions due to the methylene group at wave numbers of from 3000 to 2800 $cm^{-1}$ and characteristic absorptions due to carboxylate ions at wave numbers of from 1650 to 1500 $cm^{-1}$.

The composite metal polybasic salt (PBS) of the present invention has a novel crystal structure which is quite different from those of the known magaldrate, hydrotalcite and a salt of lithium aluminum composite hydroxide.

Figure 2:
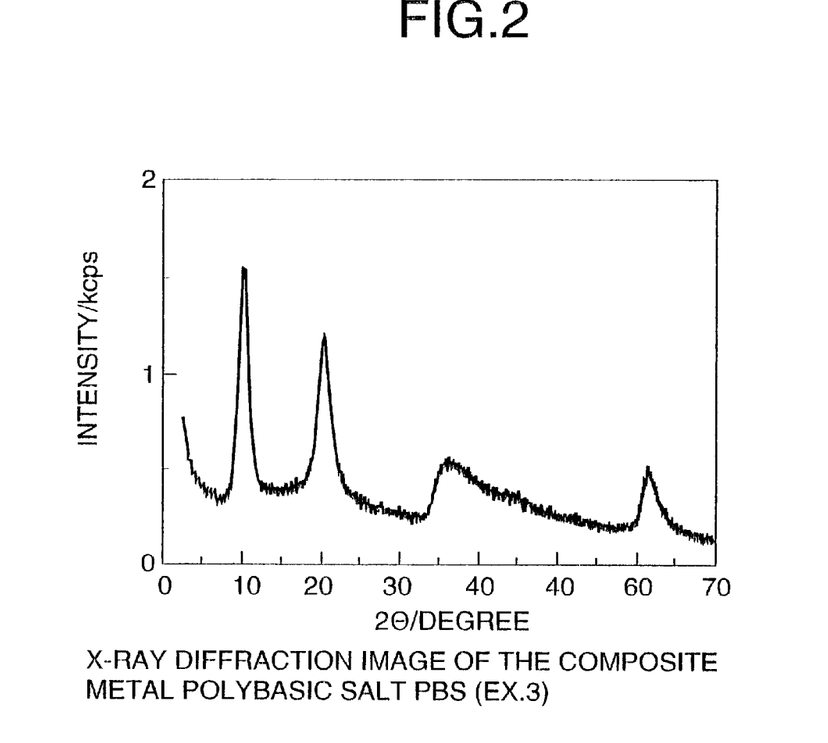
FIG. 2 is a diagram illustrating an X-ray diffraction image of an Al—Mg-type composite metal polybasic salt of the present invention.

FIG. 2 in the attached drawings shows an X-ray diffraction image of the PBS of the Al—Mg type according to the present invention.

Figure 3:
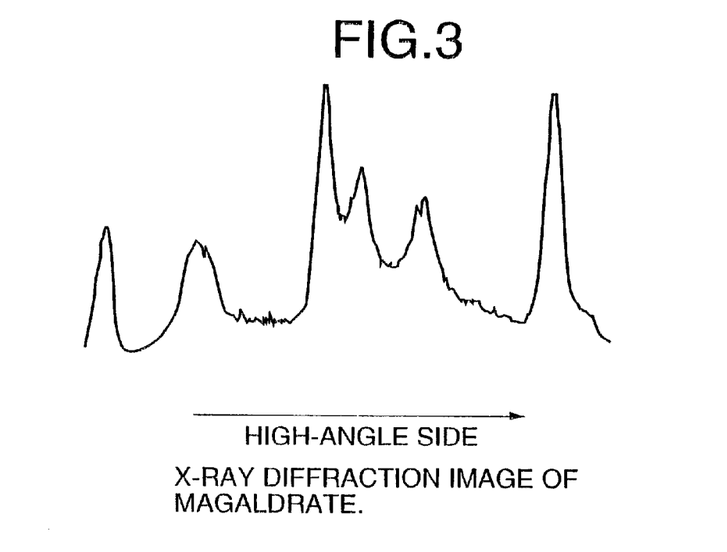
FIG. 3 is a diagram illustrating an X-ray diffraction image of a known magaldrate.
Figure 4:
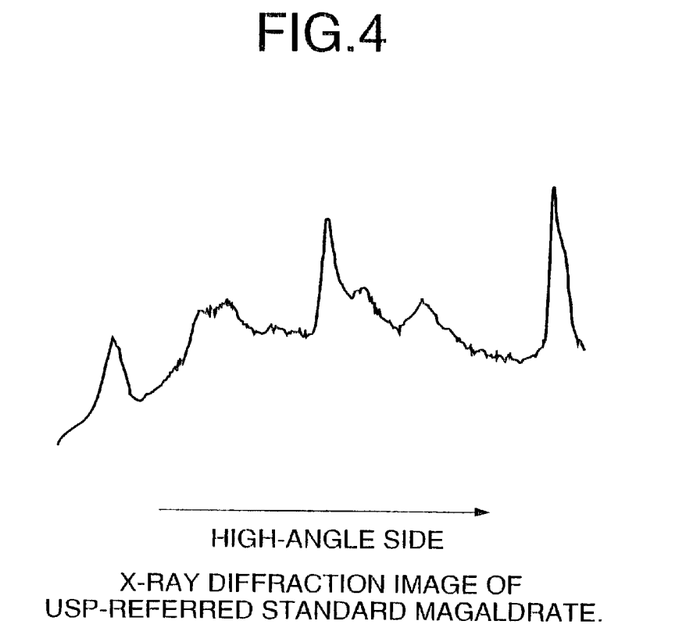
FIG. 4 is a diagram illustrating an X-ray diffraction image of a USP standard magaldrate.
Figure 5:
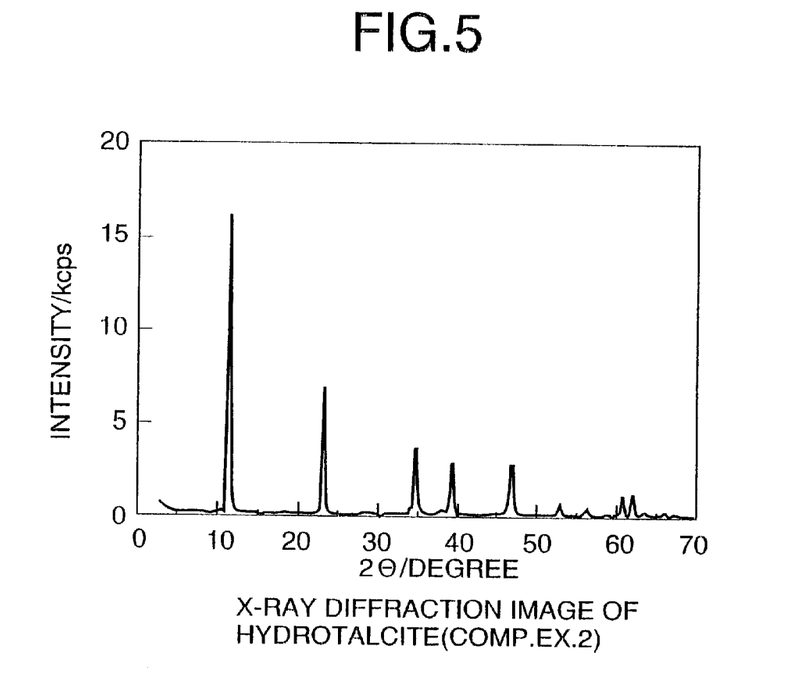
FIG. 5 is a diagram illustrating an X-ray diffraction image of the hydrotalcite.
Figure 6:
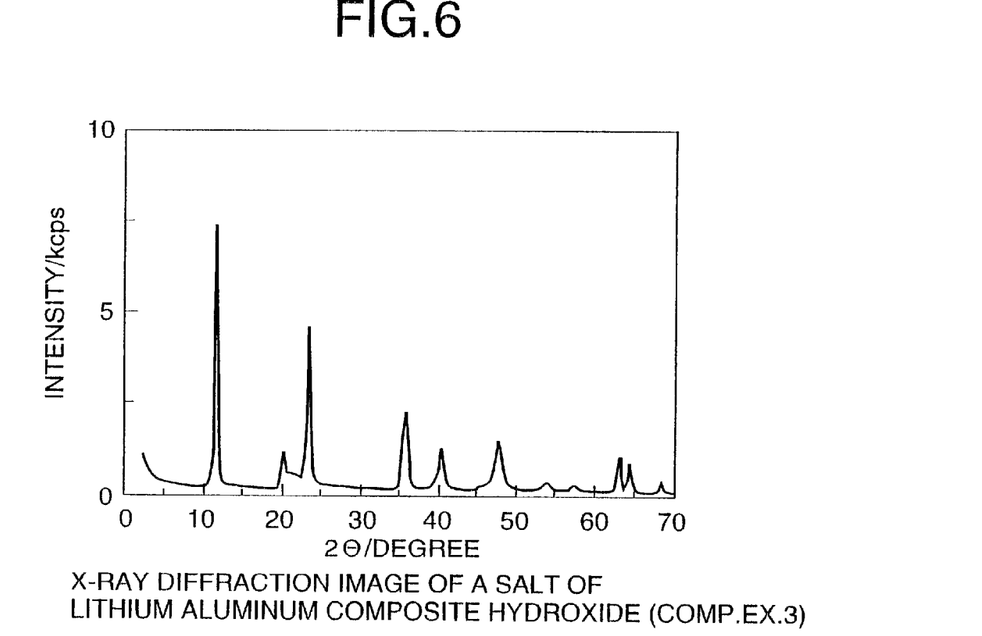
FIG. 6 is a diagram illustrating an X-ray diffraction image of a salt of lithium aluminum composite hydroxide.

FIGS. 3 and 4 are diagrams of X-ray diffraction images of known magaldrates, FIG. 5 is a diagram of an X-ray diffraction image of a hydrotalcite, and FIG. 6 is a diagram of an X-ray diffraction image of a salt of lithium aluminum composite hydroxide.

The composite metal polybasic salt of the invention in which the anions are sulfuric acid ions exhibits substantially four diffraction peaks in the X-ray diffraction (Cu-α) at 2θ=10 to 12°, 2θ=20 to 22°, 2θ=30 to 50° and 2θ=60 to 64°, the peak at 2θ=60 to 64° being a single peak.

On the other hand, the hydrotalcite (FIG. 5) exhibits two diffraction peaks in the range of 2θ=38 to 50°, and another two diffraction peaks in the range of 2θ=60 to 63°. Thus, the above two compounds exhibit quite different X-ray diffraction images.

Further, the known magaldrate exhibits diffraction peaks at 2θ=10 to 12°, 2θ=22 to 24°, 2θ=33 to 35°, 2θ=38 to 40°, 2θ=45 to 47° and 2θ=60 to 63°. Thus, the two compounds exhibit quite different X-ray diffraction images.

Similar differences are also recognized even in the case of a salt of lithium aluminum composite hydroxide (FIG. 6).

From the diffraction peaks of the X-ray diffraction images of the plane (001) at 2θ=10 to 12° of the composite metal polybasic salt of the invention and the magaldrate, further, it will be leaned that the crystals of the composite metal polybasic salt of the present invention are developing in the direction of the C-axis. Further, the composite metal polybasic salt which is a product of the present invention has a degree of orientation ($I_0$) represented by the following formula (2), $$I_0 = I_{10}/I_{60} \qquad (2)$$

wherein $I_{10}$ is an X-ray diffraction peak intensity at 2θ=2 to 15°, and $I_{60}$ is an X-ray diffraction peak intensity at 2θ=60 to 64°, of larger than 2, which is quite different from that of the known magaldrate ($I_0$<1). From this fact, the composite metal polybasic salt which is a product of the invention has primary particles that are expanding in the direction of AB-axis in the basic layer. Accordingly, the product of the present invention disperses well in the resin making it possible to strikingly improve transparency of the blended resin, chlorine-trapping property, resistance against acid and heat resistance.

Figure 7:
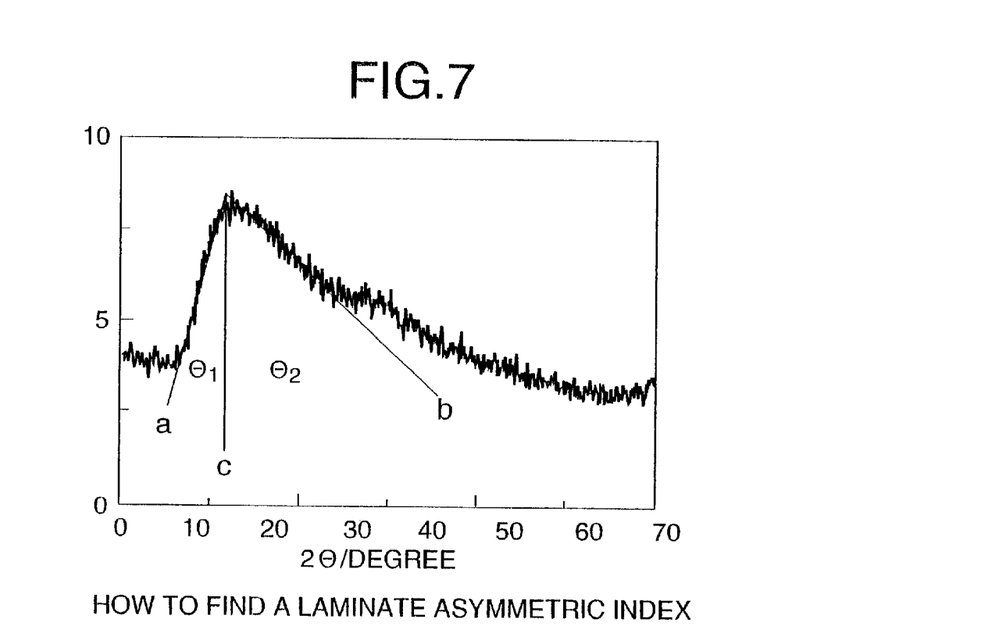
FIG. 7 is a diagram illustrating how to find a laminate asymmetric index.

As will be obvious from FIG. 7, further, the composite metal polybasic salt of the present invention has a feature in the X-ray diffractive fine structure called laminate asymmetry.

That is, it is obvious that the diffraction peak at $2\theta=33$ to $50°$ exhibited by the composite metal polybasic salt of the invention is an asymmetric peak.

In other words, it will be understood that the asymmetric peak rises relatively sharply on the narrow angle side (side on where $2\theta$ is small) and is mildly inclined on the wide angle side (side on where $2\theta$ is large). The asymmetric peak becomes conspicuous particularly at $2\theta=33$ to $50°$. Asymmetry similarly appears even at a peak of $2\theta=60$ to $64°$ though the degree of asymmetry is small.

In this specification, the laminate asymmetric index (Is) is defined as described below. That is, an X-ray diffraction chart shown in FIG. 7 is obtained by a method described in an Example appearing later. A maximum inclination peak tangent a on the narrow angle side and a maximum inclination peak tangent b on the broad angle side, are drawn on a peak at $2\theta=33$ to $50°$, and a perpendicular c is drawn from a point where the tangent a intersects the tangent b. Next, an angle $\theta1$ subtended by the tangent a and the perpendicular c, and an angle $\theta2$ subtended by the tangent b and the perpendicular c, are found. The laminate asymmetric index (Is) is found from these angles in compliance with the above formula (2).

The laminate asymmetric index (Is) is 1.0 when the peak is completely symmetrical, and increases as the breaking angle becomes larger than the rising angle. The laminate asymmetric index (Is) of the known magaldrate can similarly be found to be 1.36, and the diffraction peak at $2\theta=33$ to $35°$ is a symmetrical peak.

The laminate asymmetric index (Is) has the following meaning. In was pointed out already that the PBS of the present invention has a laminar crystal structure in which basic layers of $M^{3+}_{p}Mg_{q}(OH)_{y}$ are stacked one upon the other. However, it is believed that the sizes (lengths and areas) of the basic layers are not uniform but are varying over wide ranges and, besides, the basic layers are twisted or curved forming a structure which is not plane.

In the PBS of the present invention, therefore, the anions easily exchange ions offering a large ion-exchange capacity and a large ion-exchange rate. When this is used as an additive for a resin, for trapping, for example, chlorine ions, then, an excellent ability is exhibited.

When heated from room temperature up to a temperature of $200°$ C., the composite metal polybasic salt of the present invention exhibits a weight reduction ratio of not larger than 15% by weight and, particularly, not larger than 5% by weight, and offers a distinguished advantage that it does not develop foaming at a resin-working temperature when it is mixed into the resin. The hydrotalcite has a defect of developing foaming as the water separates at the resin-working temperature. The composite metal polybasic salt of the present invention is free from this problem.

Figure 8:
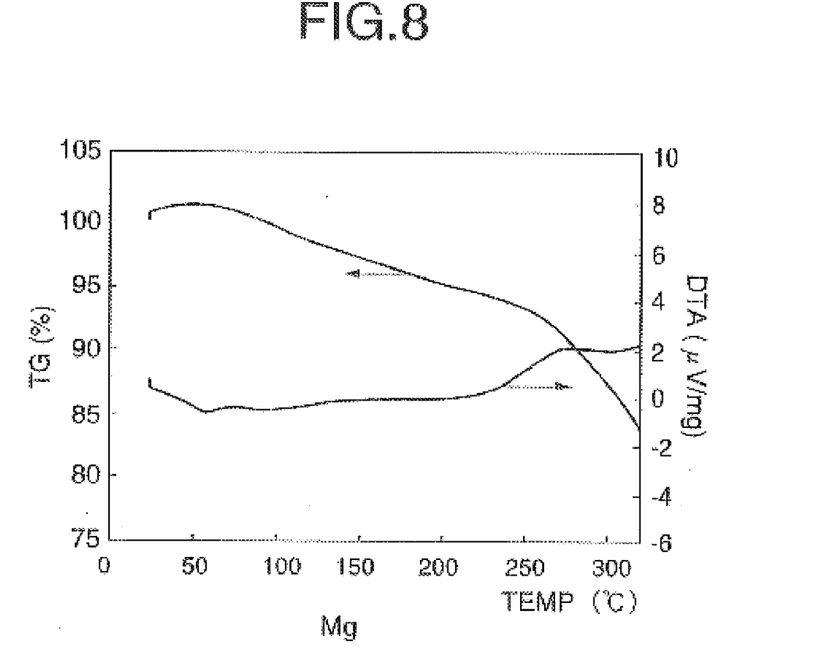
FIG. 8 is a diagram illustrating the results of differential thermal analysis of the composite metal polybasic salt which is a product of the present invention.

FIG. 8 shows the results of differential thermal analysis (DTA) of the composite metal polybasic salt of the invention and of the hydrotalcite. The hydrotalcite exhibits a very large endothermic peak due to the vaporization of water in a temperature range of from 190 to $240°$ C., whereas the PBS does not exhibit such a large endothermic peak proving its excellent resistance against the foaming.

The composite metal polybasic salt of the present invention varies the surface area to a large extent depending upon the kind of anions to be exchanged, and possesses a relative specific surface area and a small porous volume when the anions are sulfuric acid ions. In this case, the PBS of the present invention has a BET specific surface area of not larger than 20 m²/g and, particularly, in a range of from 0.3 to 10 m²/g, and a porous volume of those pores having diameters of from 17 to 3000 angstroms as found by the CI method of from 0.0005 to 0.05 ml/g and, particularly, from 0.02 to 0.035 ml/g. When the anions are silicic acid ions, on the other hand, the PBS of the present invention has a large specific surface area and a large porous volume. In the case of Example 10, for example, the BET specific surface area is about 147 m²/g and the porous volume of those pores having diameters of from 17 to 3000 angstroms is about 0.425 ml/g as found by the CI method.

The composite metal polybasic salt of the present invention has a volume based median diameter ($D_{50}$) of, generally, from 0.1 to 20 μm and, particularly, from 2 to 10 μm as measured by the laser diffraction method.

Figure 9:
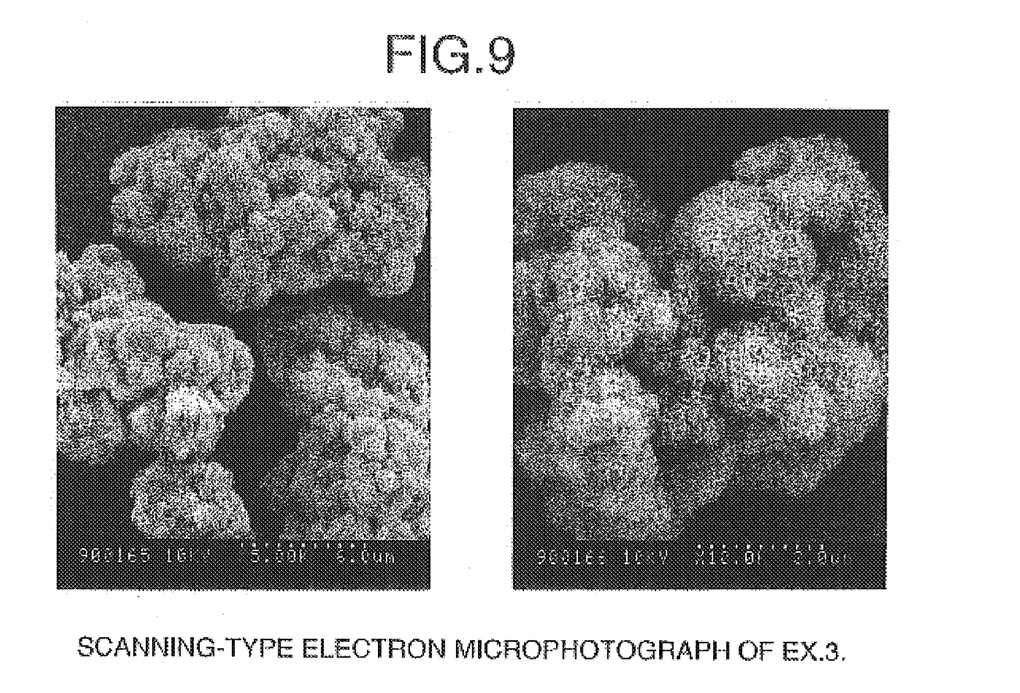
FIG. 9 is a scanning-type electron microphotograph showing the granular structure of the Al—Mg-type composite metal polybasic salt in which the anions are sulfuric acid ions.
Figure 10:
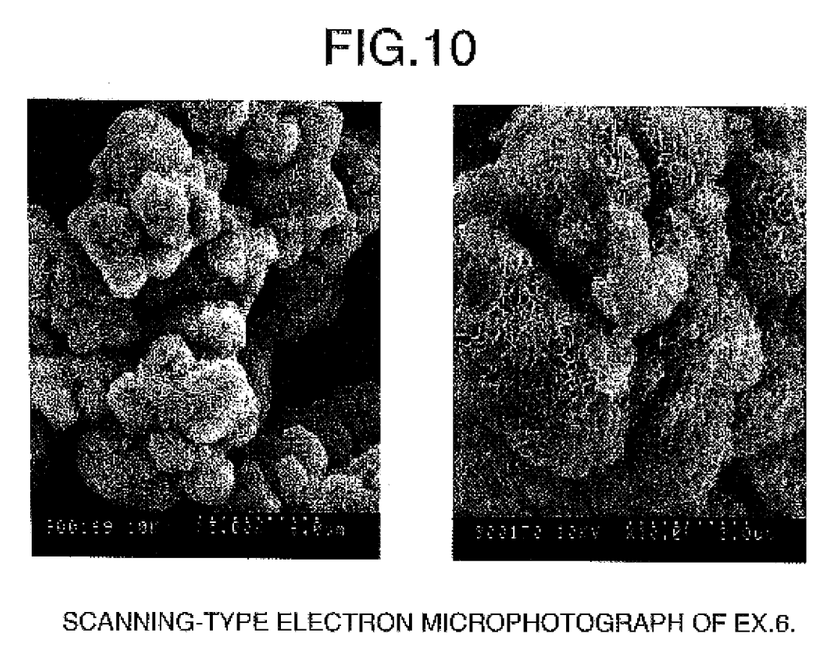
FIG. 10 is a scanning-type electron microphotograph showing the granular structure of the Al—Mg-type composite metal polybasic salt in which the anions are stearic acid ions.

FIG. 9 is a scanning-type electron microphotograph showing the granular structure of an Al—Mg-type composite metal polybasic salt in which the anions are sulfuric acid ions, and FIG. 10 is a scanning-type electron microphotograph showing the granular structure of an Al—Mg-type composite metal polybasic salt in which the anions are stearic acid ions.

These photographs tell an interesting fact that in the PBS of the Al—Mg type, the primary particles have a honeycomb- or pumice-type internal structure, and are agglomerated to form secondary particles.

The PBS of the present invention has a small porous volume as measured above despite of its honeycomb-type or pumice-type internal structure with pleat-like thin-piece texture, probably because the holes that are formed have diameters considerably larger than the above-mentioned fine pore diameters.

Further, comparison of FIG. 9 with FIG. 10 tells the fact that in the PBS of the stearic acid type, the primary particles are becoming considerably bulky due to the introduction of the stearic acid.

[Method of Preparation]

According to the present invention, the composite metal polybasic salt is prepared by reacting a water-soluble salt of a trivalent metal with an oxide, a hydroxide or a water-soluble salt of magnesium under the conditions of a pH of from 6.0 to 9.0 and a temperature of not lower than $50°$ C. and, preferably, not lower than $80°$ C. and, if necessary, executing the ion exchange in the presence of an acid or a soluble salt of acid.

As the water-soluble salt of a trivalent metal such as Al or the like, there can be used any one of a chloride, a nitrate or a sulfate that is soluble in water. From the standpoint of easy synthesis, however, it is desired in the present invention to synthesize the composite metal polybasic salt in the form of a sulfate. It is therefore most desired to use the composite metal polybasic salt in the form of a sulfate.

The starting divalent Mg metal can be used in any form of an oxide, a hydroxide or a water-soluble salt. From the standpoint of synthesis, however, it is most convenient to use an oxide such as magnesium oxide or a hydroxide such as magnesium hydroxide. Even when a water-soluble salt such as a chloride, a nitrate or a sulfate of a divalent metal is used, it is possible to synthesize a composite metal polybasic salt according to the present invention by controlling the pH in the control system to lie within the above-mentioned range, as a matter of course.

In the present invention, it is important to carry out the reaction of the above-mentioned starting materials while maintaining the pH at the time when the reaction is finished to lie within a range of from 6.0 to 9.0 and, particularly, from 6.5 to 8.0, and maintaining the reaction temperature to be not lower than 50° C. and, particularly, from 80 to 180° C.

When the pH of the reaction system lies outside the above range, it becomes difficult to form the composite metal polybasic salt. That is, the composite metal polybasic salt has a feature in that it possesses both the hydroxyl group and the anionic group that are bonded to each other. When the pH becomes larger than the above range, it becomes difficult to introduce the anionic group. When the pH becomes smaller than the above range, on the other hand, it becomes difficult to introduce the hydroxyl group.

When the temperature becomes lower than the above-mentioned range, it becomes difficult to synthesize the composite metal polybasic salt.

The reacting and mixing ratio of the trivalent metal compound and the magnesium metal compound is so set that the composition ratio of the above-mentioned general formula (1) is satisfied. In general, the molar ratio of $Mg/M^{3+}$ in the product tends to become smaller than the feeding molar ratio of $Mg/M^{3+}$ in the starting material.

Figure 11:
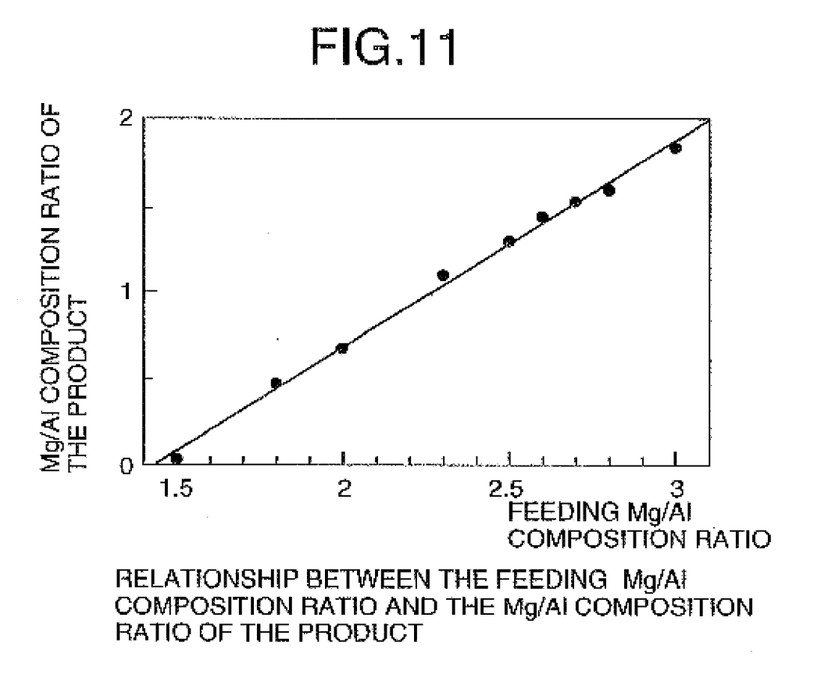
FIG. 11 is a diagram illustrating a relationship between the feeding molar ratio of Mg/$M^{3+}$ in the starting materials and the molar ratio of Mg/$M^{3+}$ in the product in relation to the Al—Mg-type composite metal polybasic salt which is the product of the present invention.

FIG. 11 in the accompanying drawing illustrates a relationship between the feeding molar ratio of $Mg/M^{3+}$ in the starting material and the molar ratio of $Mg/M^{3+}$ in the product in relation to the Al—Mg-type composite metal polybasic salt. The relationship between the two is almost linear, from which it will be understood that the molar ratio of $Mg/M^{3+}$ in the final product can be determined by determining the feeding molar ratio.

When $Mg(OH)_2$ is used as the starting Mg material and $Al_2(SO_4)_3$ is used as a starting $M^{3+}$ material, it is desired that the feeding molar ratio of $Mg/M^{3+}$ is in a range of from 1.3 to 3.5 and, particularly, from 1.6 to 3.1.

There also exists a predetermined relationship among the feeding molar ratio of $Mg/M^{3+}$ in the starting material, the molar ratio of $Mg/M^{3+}$ in the product and the molar ratio of $A/M^{3+}$ in the product. In general, the molar ratio of $A/M^{3+}$ in the product increases with an increase in the molar ratio of $Mg/M^{3+}$.

Figure 12:
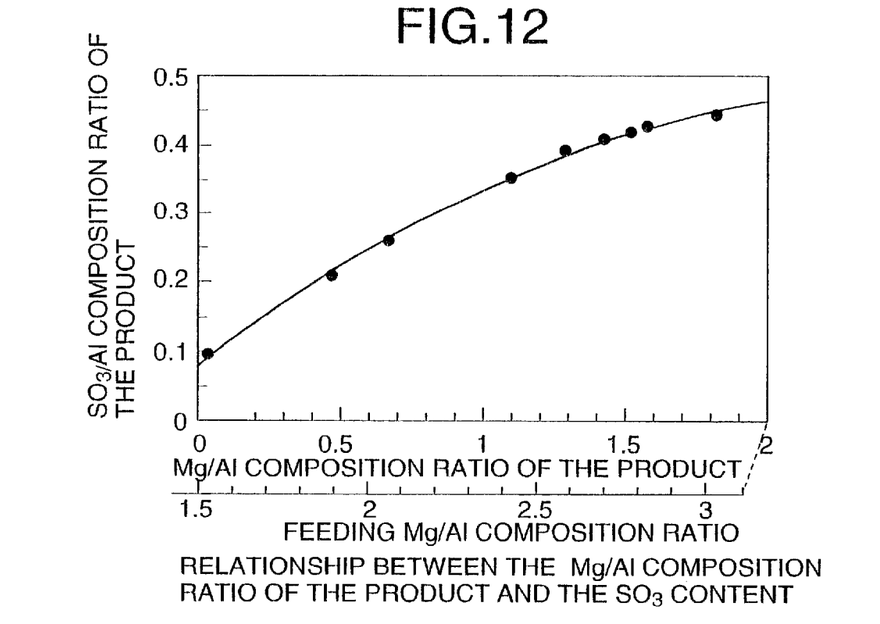
FIG. 12 is a diagram illustrating an increase in the molar ratio of $SO_3$/Al in the product accompanying an increase in the molar ratio of Mg/Al in relation to the Al—Mg-type composite metal polybasic salt which is the product of the present invention.

FIG. 12 illustrates a relationship between the above two, from which it will be learned that the molar ratio of $SO_3/Al$ in the product monotonously increases with a increase in the molar ratio of $Mg/Al$. It was pointed out already that in the PBS of the present invention, a $Mg(OH)_6$ octahedral layer of which Mg is isomorphous-substituted by $M^{3+}$ serves as a basic layer, and anions such as sulfuric acid radicals are incorporated among the basic layers in a form to be balanced with excess of cations due to the substitution. When the sulfuric acid radicals are all incorporated in a form to be balanced by excess of cations, the molar ratio of $SO_3/Al$ becomes 0.5. Therefore, the fact of FIG. 12 tells that in a state where the molar ratio of Al is small, nearly ideal state holds. However, as the molar ratio of Al increases, the degree of incorporation of the sulfuric acid radicals decreases and the bonds with the hydroxyl groups increase.

Figure 13:
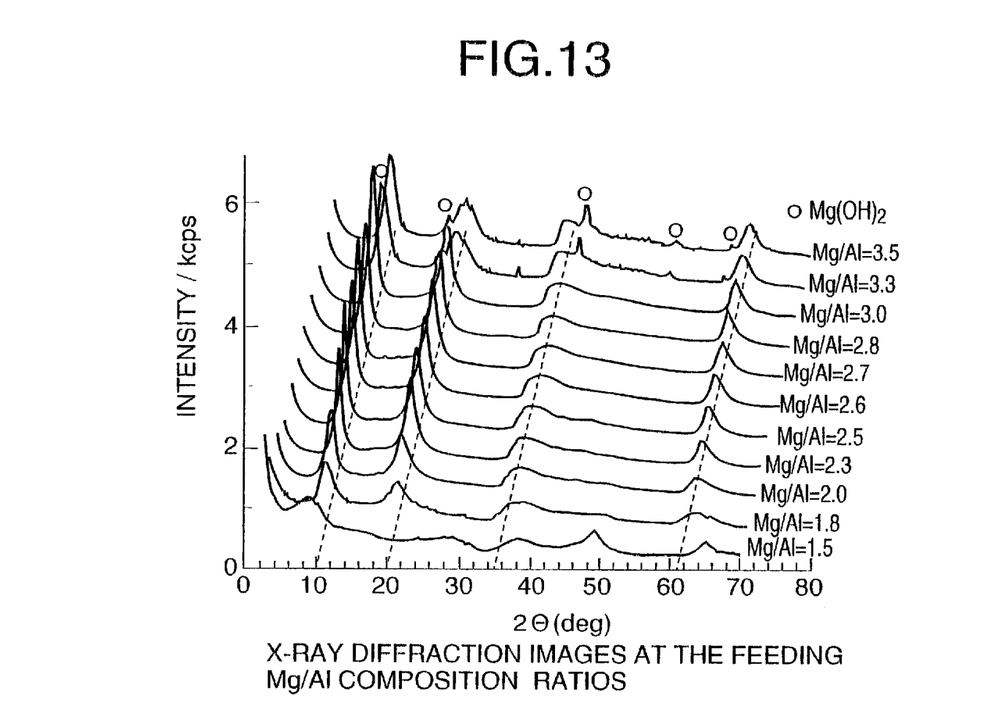
FIG. 13 is a diagram illustrating X-ray diffraction images of a product of when the feeding molar ratio Mg/Al of starting materials is changed in relation to the Al—Mg composite metal polybasic salt which is the product of the present invention.

FIG. 13 shows an X-ray diffraction image of a product of when the feeding molar ratio Mg/Al of the starting material is changed in relation to the Al—Mg composite metal polybasic salt. These results tell that the crystal structure of the present invention is stably formed when the molar ratio of Mg/Al lies within a range of from 1.8 to 3.0.

In synthesizing the composite metal polybasic salt of the present invention, there is no particular limitation on the order of mixing the two starting materials. For example, a solution of an oxide of magnesium metal, of a slurry of a hydroxide thereof or of water-soluble salts thereof may be added to an aqueous solution of trivalent metal salts. Conversely, an aqueous solution of trivalent metal salts may be added to an aqueous solution of an oxide of a divalent metal, of a slurry of a hydroxide thereof or of water-soluble salts thereof, or they may be simultaneously added together.

The reaction can be completed by maintaining the reaction mixture at the above-mentioned temperature for about 2 to 72 hours with stirring. Though not generally required, the reaction may be conducted under the hydrothermal conditions by using a pressurized container.

The reaction product is washed with water, subjected to the solid-liquid separation operation such as filtration, dried at 60 to 150° C., and, if necessary, is heat-treated at 150 to 230° C. to obtain a product.

In the composite metal polybasic salt of the present invention, a variety of anions can be introduced by the ion-exchange method. As the starting composite metal polybasic salt to be used for the anion-exchange, it is desired to use the composite metal polybasic salt of the sulfuric acid type.

As the anions to be subjected to the ion-exchange, there is used an alkali metal salt such as sodium salts of the above-mentioned anions. For example, a sodium bicarbonate or a sodium carbonate is used for introducing carboxylic acid radicals, a sodium carboxylate or sodium sulfonate is used for introducing organic acid anions, a sodium phosphate, a monohydrogen sodium phosphate or a dihydrogen sodium phosphate is used for introducing phosphoric acid radicals, and a sodium silicate is used for introducing silicic acid radicals, to which only, however, the invention is in no way limited.

Anions based on the ion exchange can be introduced by bringing a composite metal polybasic salt of the sulfuric acid type in the form of a powder or a wet cake into uniform contact with an aqueous solution of a salt of the above-mentioned anions at a temperature of from 0 to 100° C. In general, the ion-exchange processing is completed by executing the contact for from about 5 minutes to about 3 hours.

The obtained product is subjected to the filtration, washing with water, drying and, if necessary, to the pulverization and classification to obtain a product.

The composite metal polybasic salt of the present invention can be used in its own form as an additive for resins, as an anion-exchanger or as a heat insulator. If necessary, however, it may be coated with an organic assistant or an inorganic assistant and can, then, be used for a variety of applications.

As the organic assistant, there can be exemplified such coating agents as metal soaps such as calcium salt, zinc salt, magnesium salt and barium salt of stearic acid, palmitic acid or lauric acid; silane coupling agent, aluminum coupling agent, titanium coupling agent, zirconium coupling agent, various waxes, and unmodified or modified resins (e.g., rosin, petroleum resin, etc.). The composite metal polybasic salt of the present invention can be treated for its surfaces with the above coating agent and can be used for a variety of applications.

It is desired to use the coating agent in an amount of from 0.5 to 10% by weight and, particularly, from 1 to 5% by weight with respect to the PBS.

As the inorganic assistant, there can be exemplified regular particles of fine particulate silica such as aerosil and hydrophobically treated aerosil, silicates such as calcium silicate and magnesium silicate, metal oxides such as calcia, magnesia and titania, metal hydroxide such as magnesium hydroxide and aluminum hydroxide, metal carbonates such as calcium carbonate, synthetic zeolites of the A-type and P-type and acid-treated products thereof or metal ion-exchanged product thereof, with which the PBS can be blended or sprinkled.

It is desired to use these inorganic assistants in an amount of from 0.01 to 200% by weight and, particularly, from 0.1 to 200% by weight per the PBS.

As additives, there may be further blended urea, ethyleneurea, propyleneurea, 5-hydroxypropyleneurea, 5-methoxypropyleneurea, 5-methylpropyleneurea, parabanic acid, 4,5-dimethoxyethyleneurea, pyrrolidene, piperidine, morpholine, dicyandiamide, 2-hydrazobenzothiazole, potassium permanganate, benzalkonium chloride, iodophor, hydrazine, hydrazine sulfate, aluminum sulfate hydrazine sulfate complex salt, organic/inorganic antibacterial agent (iodophor and silver-exchanged zeolite), and optical catalyst (titanium oxide, etc.).

[Use]

The PBS of the present invention has excellent properties as described above. By utilizing these properties, the PBS can be used in such applications as an additive for resins, an ion (anion)-exchanger, a heat insulator, a base member for cosmetics, a de-odoring/antibacterial agent, a flame retardant, an ultraviolet ray-absorbing agent, a nanocomposite starting material, etc.

The composite metal polybasic salt of the present invention is useful as an additive for thermoplastic resins, thermosetting resins and various rubbers.

That is, the composite metal polybasic salt of the present invention does not develop foaming that is caused when the water separates at the resin-working temperature, can be easily blended in the resin, and exhibits excellent heat stability since it contains components such as magnesium metal, trivalent metal components and hydroxyl groups that impart heat-stabilizing property to the resins. Besides, the composite metal polybasic salt has anion-exchanging property and exhibits excellent property for trapping chlorine ions. Moreover, the composite metal polybasic salt absorbs far infrared rays and exhibits excellent heat-retaining property.

Thus, the composite metal polybasic salt of the invention can be blended in the resins as a heat stabilizer, a halogen catcher, a heat-retaining agent (a heat insulator) or as an anti-blocking agent.

As the thermoplastic resin to be blended with the composite metal polybasic salt of the present invention, there can be preferably exemplified an olefin resin and, particularly, a low-, an intermediate- or a high-density polyethylene, an isotactic polypropylene, a syndiotactic polypropylene, or a polypropylene polymer which is a copolymer thereof with an ethylene or an α-olefin, a linear low-density polyethylene, an ethylene/propylene copolymer, a polybutene-1, an ethylene/butene-1 copolymer, a propylene/butene-1 copolymer, an ethylene/propylene/butene-1 copolymer, an ethylene/vinyl acetate copolymer, an ionically crosslinked olefin copolymer (ionomer), or an ethylene/acrylic acid ester copolymer, which may be used in a single kind or being blended in two or more kinds.

The additive for resins of the present invention can also be used for other known resin films, fibers and resin-molded articles, such as polyamides like nylon 6, nylon 6-6, nylon 6-10, nylon 11 and nylon 12, thermoplastic polyesters such as polyethylene terephthalate and polybutylene terephthalate, as well as polycarbonate, polysulfone, vinyl chloride resin, vinylidene chloride resin and vinyl fluoride resin.

When used as an additive for resins, it is desired that the composite metal polybasic salt is used in an amount of from 0.01 to 200 parts by weight and, particularly, in an amount of from 0.1 to 100 parts by weight per 100 parts by weight of the thermoplastic resin.

The thermoplastic resins, various rubbers and thermosetting resins can be blended with the composite metal polybasic salt of the present invention as an additive for reforming the resins.

As the elastomer polymer for rubbers, there can be exemplified a nitrile-butadiene rubber (NBR), a styrene-butadiene rubber (SBR), a chloroprene rubber (CR), a polybutadiene (BR), a polyisoprene (IIPI), a butyl rubber, a natural rubber, an ethylene-propylene rubber (EPR), an ethylene-propylene-diene rubber (EPDM), a polyurethane, a silicone rubber and an acrylic rubber. As the thermoplastic elastomer, there can be exemplified a styrene-butadiene-styrene block copolymer, a styrene-isoprene-styrene block copolymer, a hydrogenated styrene-butadiene-styrene block copolymer, a hydrogenated styrene-isoprene-styrene block copolymer, a partially crosslinked olefinic thermoplastic elastomer.

As the thermosetting resin, there can be exemplified a phenol-formaldehyde resin, a furan-formaldehyde resin, a xylene-formaldehyde resin, a ketone-formaldehyde resin, a urea-formaldehyde resin, a melamine-formaldehyde resin, an alkyd resin, an unsaturated polyester resin, an epoxy resin, a bismaleimide resin, a triallylcyanulate resin, a thermosetting acrylic resin and a silicone resin, which may be used in a combination of two or more kinds.

In this case, the composite metal polybasic salt of the present invention is used in an amount of from 0.01 to 200 parts by weight and, particularly, in an amount of from 0.1 to 100 parts by weight per 100 parts by weight of the thermoplastic resin, thermosetting resin or elastomer.

EXAMPLES

The invention will now be described by way of Examples to which only, however, the invention is in no way limited. The testing was conducted in compliance with the following methods.

(1) X-ray Diffraction Measurement

Measured for Cu-Kα by using a RAD-IB system manufactured by Rigaku Denki Co.

| | |
|---|---|
| Target | Cu |
| Filter | curved crystalline graph-monochrometer |
| Detector | SC |
| Voltage | 35 KV |
| Current | 15 mA |
| Count full-scale | 8000 cps |
| Smoothing point | 25 |
| Scanning speed | 2°/mm |
| Step sampling | 0.033° |
| Slit | DS1° RS 0.30 mm SS1° |
| Irradiating angle | 6° |

(2) Infrared Ray Absorption Spectral Analysis

Measured by using an FT/IR-610 infrared absorption spectral analyzer manufactured by Nihon Bunko Co.

(3) Differential Thermal Analysis

Measured by using a TAS-100-TG8110 manufactured by Rigaku Co. under the measuring conditions of using a standard substance α-$Al_2O_3$, raising the temperature at a rate of 10° C./min. in the air at 20 to 320° C.

(4) Observation Using a Scanning-type Electron Microscope

Observed by using a scanning electron microscope, S-570, manufactured by Hitachi, Ltd.

(5) Specific Surface Area/porous Volume

Measured with $N_2$ using ASAP-2010 manufactured by Shimazu Seisakusho Co.

(6) Average Particle Diameter

Measured by using LS-230 manufactured by Coulter Co.

Example 1

Ion-exchanged water was added to 94.57 g of a magnesium hydroxide (MgO=64.2%) so that the total amount was 400 ml, followed by stirring and dispersion to prepare an $Mg(OH)_2$ slurry.

400 Grams of an aluminum sulfate ($Al_2O_3$=7.68%, $SO_3$=18.1%) was introduced into a 1000-ml beaker and to which the above $Mg(OH)_2$ slurry was gradually added at room temperature with stirring, and the mixture was messed-up to 1500 ml. Thereafter, the temperature was elevated to 90° C. to conduct the reaction for 5 hours.

After the reaction, the reaction product was filtered, washed with 3000 ml of hot water, dried at 110° C. and was pulverized to obtain a white powder.

The composition of the obtained fine powder was analyzed to be as follows. Properties were as shown in Table 1.

| $Al_{1.00}Mg_{1.23}(OH)_{4.71}(SO_4)_{0.37} \cdot 1.6H_2O$ | |
|---|---|
| 2 θ | Relative intensity |
| 10.30° | 100% |
| 22.40° | 55% |
| 37.10° | 40% |
| 63.20° | 27% |

Example 2

Ion-exchanged water was added to 87.01 g of a magnesium hydroxide (MgO=64.2%) in a 1000-ml beaker so that the total amount was 400 ml, followed by stirring and dispersion to prepare an $Mg(OH)_2$ slurry.

400 Grams of an aluminum sulfate ($Al_2O_3$=7.68%, $SO_3$=18.1%) was gradually added the above $Mg(OH)_2$ slurry at room temperature with stirring, and the mixture was messed-up to 900 ml. Thereafter, the temperature was elevated to 90° C. to conduct the reaction for 10 hours.

After the reaction, the reaction product was filtered, washed with 1800 ml of hot water, dried at 110° C. and was pulverized to obtain a white powder.

The composition of the obtained fine powder was analyzed to be as follows. Properties were as shown in Table 1.

| $Al_{1.00}Mg_{1.23}(OH)_{4.50}(SO_4)_{0.35} \cdot 1.6H_2O$ | |
|---|---|
| 2 θ | Relative intensity |
| 10.30° | 100% |
| 20.33° | 54% |
| 35.33° | 19% |
| 61.13° | 24% |

Example 3

Ion-exchanged water was added to 170.23 g of a magnesium hydroxide (MgO=64.2%) in a 2000-ml beaker so that the total amount was 750 ml, followed by stirring and dispersion to prepare an $Mg(OH)_2$ slurry.

720 Grams of an aluminum sulfate ($Al_2O_3$=7.68%, $SO_3$=18.1%) was gradually added the above $Mg(OH)_2$ slurry at room temperature with stirring, and the mixture was messed-up to 1500 ml. Thereafter, the temperature was elevated to 90° C. to conduct the reaction for 15 hours.

After the reaction, the reaction product was filtered, washed with 3000 ml of hot water, dried at 110° C. and was pulverized to obtain a white powder.

The composition of the obtained fine powder was analyzed to be as follows. Properties were as shown in Table 1.

| $Al_{1.00}Mg_{1.29}(OH)_{4.81}(SO_4)_{0.39} \cdot 1.5H_2O$ | |
|---|---|
| 2 θ | Relative intensity |
| 10.17° | 100% |
| 20.21° | 66% |
| 35.85° | 23% |
| 61.33° | 29% |

The polybasic salt EX-3 possessed a BET specific surface area of 4.15 $m^2$/g and a porous volume of 0.032 cc/g. An X-ray diffraction image of the polybasic salt EX-3 is shown in FIG. 2 and a scanning electron microphotograph thereof is shown in FIG. 9.

Example 4

3.80 Grams of $NaHCO_3$ (purity, 99%) was introduced into a 500-ml beaker, and to which ion-exchanged water was added to prepare 100 ml of a $NaHCO_3$ solution.

Separately, 10 g of the fine white powder obtained in Example 3 was dispersed in 200 ml of ion-exchanged water, and to which the above $NaHCO_3$ solution was added. The mixture was heated at 90° C. and was stirred for two hours. After the reaction, the reaction product was filtered, washed with hot water, dried at 110° C. for 12 hours and was pulverized to obtain a white powder.

The composition of the obtained fine powder was analyzed to be as follows. Properties were as shown in Table 1.

| $Al_{1.00}Mg_{1.23}(OH)_{4.81}(SO_4)_{0.11}(CO_3)_{0.28} \cdot 1.7H_2O$ | |
|---|---|
| 2 θ | Relative intensity |
| 11.67° | 100% |
| 23.47° | 33% |
| 35.03° | 31% |
| 39.50° | 12% |
| 46.67° | 9% |
| 61.27° | 29% |

Example 5

17.91 Grams of sodium stearate was added to 300 ml of ion-exchanged water in a 500-ml beaker, and the mixture was heated at 80° C. and was stirred to prepare a sodium stearate solution.

Separately, 87.01 g of magnesium hydroxide (MgO=64.2%) and ion-exchanged water were added into a 1000-ml beaker so that the total amount was 400 ml, followed by stirring and dispersion to prepare an $Mg(OH)_2$ slurry. 400 Grams of an aluminum sulfate ($Al_2O_3$=7.68%, $SO_3$=18.1%)

was gradually added to the above $Mg(OH)_2$ slurry at room temperature with stirring, and the mixture was messed-up to 900 ml. Thereafter, the temperature was elevated to 90° C. to conduct the reaction for 10 hours. After the reaction, the reaction product was filtered, washed with 1800 ml of hot water, dried at 110° C. and was pulverized to obtain a white powder. 10 Grams of the fine white powder was dispersed in 200 ml of ion-exchanged water, which was, then, added to the above sodium stearate solution. The mixture was then heated at 90° C. and was stirred for two hours. After the reaction, the reaction product was filtered, washed with 1000 ml of hot water, and was dried at 110° C. using a blower-drier overnight.

The composition of the obtained fine powder was analyzed to be as follows. Properties were as shown in Table 1.

| $Al_{1.00}Mg_{1.10}(OH)_{4.50}(C_{18}H_{35}O_2)_{0.35} \cdot 0.8H_2O$ | |
| --- | --- |
| 2 θ | Relative intensity |
| 2.26° | 23% |
| 5.20° | 53% |
| 8.34° | 12% |
| 21.14° | 100% |
| 35.48° | 13% |
| 61.46° | 9% |

Example 6

1.87 Grams of NaOH was dissolved in 300 ml of ion-exchanged water in a 500-ml beaker. 12.74 Grams of stearic acid was added thereto, and the mixture was heated at 80° C. and was stirred to prepare a sodium stearate solution.

Separately, 33.33 g of the reaction product (solid content of 30%) after washed obtained in Example 3 was dispersed in 200 ml of ion-exchanged water. The mixture was added to the above sodium stearate solution and was heated at 90° C. and was stirred for two hours. After the reaction, the reaction product was filtered, washed with 1000 ml of hot water and was dried at 110° C. using a blower-drier overnight.

The composition of the obtained fine powder was analyzed to be as follows. Properties were as shown in Table 1.

| $Al_{1.00}Mg_{1.29}(OH)_{4.81}(C_{18}H_{35}O_2)_{0.39} \cdot 0.7H_2O$ | |
| --- | --- |
| 2 θ | Relative intensity |
| 2.26° | 20% |
| 5.03° | 44% |
| 8.17° | 5% |
| 21.27° | 100% |
| 35.43° | 15% |
| 61.20° | 12% |

The results of differential thermal analysis (DTA) of the polybasic salt are shown in FIG. 8 and a scanning-type electron microphotograph thereof is shown in FIG. 10.

Example 7

10.9 Grams of $Na_2HPO_4 \cdot 12H_2O$ (purity of 99%) was introduced into a 500-ml beaker, and to which ion-exchanged water was added to prepare 250 ml of an $Na_2HPO_4$ solution.

10 Grams of the fine white powder obtained in Example 3 was added to the above $Na_2HPO_4$ solution, and the mixture was messed-up to 300 ml and was heated at 90° C. and was stirred for two hours. After the reaction, the reaction product was filtered, washed with 1000 ml of hot water, dried at 110° C. for 12 hours and was pulverized to obtain a fine white powder. The composition of the obtained fine powder was analyzed to be as follows. Properties were as shown in Table 1.

| $Al_{1.00}Mg_{1.32}(OH)_{5.18}(HPO_4)_{0.23} \cdot 1.7H_2O$ | |
| --- | --- |
| 2 θ | Relative intensity |
| 11.27° | 100% |
| 21.98° | 42% |
| 35.85° | 37% |
| 61.70° | 38% |

Example 8

A white powder was obtained through the same operation as in Example 7 but using 9.53 g of $NaH_2PO_4 \cdot 2H_2O$ (purity of 99%) instead of $Na_2HPO_4 \cdot 12H_2O$.

The composition of the obtained fine powder was analyzed to be as follows. Properties were as shown in Table 1.

| $Al_{1.00}Mg_{1.25}(OH)_{5.14}(H_2PO_4)_{0.36} \cdot 1.9H_2O$ | |
| --- | --- |
| 2 θ | Relative intensity |
| 10.13° | 75% |
| 21.30° | 100% |
| 36.30° | 38% |
| 61.66° | 51% |

Example 9

A white powder was obtained through the same operation as in Example 7 but using 7.74 g of $Na_3PO_4 \cdot 12H_2O$ (purity of 99%) instead of $Na_2HPO_4 \cdot 12H_2O$.

The composition of the obtained fine powder was analyzed to be as follows. Properties were as shown in Table 1.

| $Al_{1.00}Mg_{1.30}(OH)_{4.81}(SO_4)_{0.06}(Si_3O_7)_{0.34} \cdot 1.3H_2O$ | |
| --- | --- |
| 2 θ | Relative intensity |
| 11.71° | 100% |
| 23.24° | 34% |
| 35.55° | 32% |
| 61.30° | 33% |

Example 10

25.0 Grams of a sodium silicate solution No. 3 ($SiO_2$=22.0%, $Na_2O$=7.08%) was introduced into a 500-ml beaker, and to which ion-exchanged water was added to prepare 200 ml of a sodium silicate aqueous solution.

Separately, 33.33 g of the reaction product (solid content of 30%) after washed obtained in Example 3 was dispersed in 100 ml of ion-exchanged water. The mixture was added to the above sodium silicate solution and was heated at 50° C. and was stirred for two hours. After the reaction, the reaction product was filtered, washed with hot water, dried at 110° C. for 12 hours and was pulverized to obtain a fine white powder.

The composition of the obtained fine powder was analyzed to be as follows. Properties were as shown in Table 1.

$Al_{1.00}Mg_{1.30}(OH)_{4.81}(SO_4)_{0.06}(Si_3O_7)_{0.34} \cdot 1.3H_2O$

| 2 θ | Relative intensity |
|---|---|
| 8.03° | 31% |
| 14.57° | 30% |
| 22.60° | 100% |
| 35.53° | 46% |
| 61.37° | 50% |

| 2 θ | Relative intensity |
|---|---|
| 11.42° | 57% |
| 23.22° | 44% |
| 34.91° | 78% |
| 39.16° | 30% |
| 46.07° | 37% |
| 60.95° | 100% |
| 62.32° | 85% |

TABLE 1

| | Laminate asymmetric indexes $I_s$ | Degree of orientation $I_o$ | Specific surface area (m²/g) | Porous volume (ml/g) | Average particle diameter (μm) | q/p | y/q + p | p + q/z |
|---|---|---|---|---|---|---|---|---|
| Example No. | | | | | | | | |
| 1 | 2.53 | 3.68 | 1.07 | 0.0042 | 4.1 | 0.47 | 2.40 | 7.35 |
| 2 | 7.85 | 4.15 | 3.40 | 0.0231 | 6.0 | 1.82 | 2.04 | 6.41 |
| 3 | 5.51 | 3.42 | 4.15 | 0.0318 | | 1.29 | 2.10 | 5.87 |
| 4 | 1.71 | — | | | | 1.30 | 2.09 | 5.90 |
| 5 | 5.38 | — | | | | 1.10 | 2.14 | 6.29 |
| 6 | 3.22 | — | | | | 1.29 | 2.10 | 5.87 |
| 7 | 5.41 | — | | | | 1.32 | 2.23 | 10.09 |
| 8 | 2.72 | — | | | | 1.25 | 2.28 | 6.25 |
| 9 | 6.74 | — | | | | 1.57 | 2.14 | 11.68 |
| 10 | 1.53 | — | 146 | 0.425 | | 1.30 | 2.09 | 5.75 |
| Comparative Example No. | | | | | | | | |
| 1 | 1.36 | 0.57 | | | | — | — | — |
| 2 | — | — | | | | | | |
| 3 | — | — | | | | 0.25 | 2.00 | | p, q, y and z are indexes of $M^{3+}{}_pMg_q(OH)_y(A)_z \cdot nH_2O$.

Comparative Example 1

Synthesis of Magaldrate 100.34 Grams of an aluminum sulfate ($Al_2O_3$=7.68%, $SO_3$=18.1%) was added to 1112.4 g of an activated aluminum hydroxide paste ($Al_2O_3$=1.50%), and to which was further added 60.00 g of magnesium hydroxide (MgO= 64.2%) with vigorous stirring. And then, the reaction mixture is left quietly for 24 hours to maintain the reaction.

The paste after the reaction was dried at 110° C. and was pulverized to obtain a white powder.

From the X-ray analysis, the obtained fine powder was a mixture of a magaldrate disclosed in Japanese Examined Patent Publication (Kokoku) No. 58210/1990 and an aluminum hydroxide (gibbsite), and the magaldrate only could not be obtained.

FIG. 3 shows an X-ray diffraction image of the magaldrate disclosed in Japanese Examined Patent Publication (Kokoku) No. 58210/1990 and FIG. 4 shows an X-ray diffraction image of a USP-referred standard magaldrate. Since these drawings do not show a scale of angles, the angles refer to values of the Journal of Pharmaceutical Science, Vol. 1.6, p. 325, 1978.

Comparative Example 2

Synthesis of Hydrotalcite

Ion-exchanged water was added to 121.21 g of $Mg(OH)_2$ (MgO=64.2%), 76.06 g of $Al(OH)_3$ (purity of 99%) and 103.35 g of $Na_2CO_3$ (purity of 99%) such that the total amount was 4000 ml. The mixture was stirred to prepare a slurry which was then hydrothermally reacted at 170° C. for 24 hours.

After the reaction, the reaction product was filtered, washed with 6000 ml of hot water, dried at 110° C. and was pulverized to obtain a white powder.

The composition of the obtained fine powder was analyzed to be as follows.

$Al_6Mg_2(OH)_{16}(CO_3) \cdot nH_2O$

| 2 θ | Relative intensity |
|---|---|
| 11.63° | 100% |
| 23.38° | 42% |
| 34.79° | 21% |
| 39.35° | 16% |
| 46.81° | 17% |
| 60.59° | 6% |
| 61.96° | 7% |

An X-ray diffraction image of the hydrotalcite is shown in FIG. 5.

Comparative Example 3

Synthesis of a Salt of Lithium Aluminum Composite Hydroxide.

25.00 Grams of sodium hydroxide (NaOH content of 96%) and 7.44 g of sodium carbonate ($Na_2CO_3$ content of 99.7%) were added to 2 liters of distilled water with stirring, and the mixture was heated at 40° C. Then, to this solution was gradually added an aqueous solution which was obtained by adding 4.33 g of lithium chloride (52.90% of $Li_2O$) and 49.78 g of aluminum chloride (20.48% of $Al_2O_3$) to 500 ml of distilled water such that the molar ratio of Al/Li was 2.0. The reaction was conducted with stirring at a temperature of 90° C. for 20 hours. The obtained reaction suspension was filtered, washed with water, dried at 70° C. and was, then, pulverized using a small sample mill to obtain a white powder.

The composition of the obtained fine powder was analyzed to be as follows.

| 2 θ | Relative intensity |
|---|---|
| 11.77° | 100% |
| 20.20° | 11% |
| 23.61° | 59% |
| 36.07° | 29% |
| 40.63° | 14% |
| 48.03° | 18% |
| 63.24° | 11% |
| 64.54° | 9% |

An X-ray diffraction image of the salt of lithium aluminum composite hydroxide is shown in FIG. 6.

The present invention provides a composite metal polybasic salt containing a trivalent metal and magnesium as metal components and having a novel crystal structure, and a method of preparing the same. The invention further provides a composite metal polybasic salt which has anion-exchanging property, which by itself is useful as an anion-exchanger, capable of introducing anions suited for the use upon anion-exchange, and finds a wide range of applications, and a method of preparing the same.

What is claimed is:

1. A composite metal polybasic salt having a chemical composition represented by the following general formula (1), $$M^{3+}{}_p Mg_q(OH)_y(A)_z \cdot nH_2O \qquad (1)$$

wherein $M^{3+}$ is Al, A is $SO_4^{2-}$, and p, q, y, and z are numbers satisfying the following formulas, 3p+2q−y−mz=0 (wherein m is a valency of anion A), 0.3≦q/p≦2.5, 1.5≦y/(p+q)≦3.0, and 4.0≦(p+q)/z≦20.0, and n is a number of not larger than 7, exhibiting diffraction peaks at 2θ=2 to 15° and 2θ=19.5 to 24° and a single peak at 2θ=33 to 50° and 2θ=60 to 64° in the X-ray diffraction (Cu-α), and having a degree of orientation ($I_0$) represented by the following formula (2) of not smaller than 1.5, $$I_0 = I_{10}/I_{60} \qquad (2)$$

wherein $I_{10}$ is an X-ray diffraction peak intensity at 2θ=2 to 15°, and $I_{60}$ is an X-ray diffraction peak intensity at 2θ=60 to 64°.

2. A composite metal polybasic salt according to claim 1, wherein an X-ray diffraction (Cu-α) peak at 2θ=10 to 12° has a relative intensity of 100%, at 2θ=20 to 22° has a relative intensity of 20 to 80%, at 2θ=33 to 50° has a relative intensity of 10 to 60% and at 2θ=60 to 63° has a relative intensity of 5 to 50%.

3. A composite metal polybasic salt according to claim 1, wherein, when photographed by using a scanning-type electron microscope, said composite metal polybasic salt has a pleat-like thin-piece texture.

4. A composite metal polybasic salt according to claim 1, wherein said composite metal polybasic salt has a laminate asymmetric index (Is) defined by the following formula (3), $$Is = \tan\theta_2 / \tan\theta_1 \qquad (3)$$

wherein $\theta_1$ is an angle subtended by a peak perpendicular in the X-ray diffraction peak of a predetermined spacing and a peak tangent on the narrow angle side, and $\theta_2$ is an angle subtended by the peak perpendicular at the above peak and a peak tangent on the wide angle side, is not smaller than 1.5 at a peak of 2θ=33 to 50°.

5. An additive for resins comprising a composite metal polybasic salt according to claim 1.

6. A heat insulator comprising a composite metal polybasic salt according to claim 1.

7. An anion-exchanger comprising a composite metal polybasic salt according to claim 1.

* * * * *